United States Patent
Murata et al.

(10) Patent No.: US 9,296,144 B2
(45) Date of Patent: Mar. 29, 2016

(54) MOLDING METHOD OF INJECTION MOLDING MACHINE

(75) Inventors: Hirofumi Murata, Hanishina-gun (JP); Isamu Komamura, Hanishina-gun (JP); Nobukazu Kasuga, Hanishina-gun (JP); Takashi Hakoda, Hanishina-gun (JP); Hitoshi Saitoh, Hanishina-gun (JP)

(73) Assignee: NISSEI PLASTIC INDUSTRIAL CO., LTD., Nagano (JP)

( * ) Notice: Subject to any disclaimer, the term of this patent is extended or adjusted under 35 U.S.C. 154(b) by 119 days.

(21) Appl. No.: 13/391,249

(22) PCT Filed: Jun. 14, 2011

(86) PCT No.: PCT/JP2011/003371
§ 371 (c)(1),
(2), (4) Date: Feb. 17, 2012

(87) PCT Pub. No.: WO2011/161899
PCT Pub. Date: Dec. 29, 2011

(65) Prior Publication Data
US 2012/0146260 A1 Jun. 14, 2012

(30) Foreign Application Priority Data
Jun. 25, 2010 (JP) .................................. 2010-144775

(51) Int. Cl.
*B29B 7/00* (2006.01)
*B29C 45/57* (2006.01)
(Continued)

(52) U.S. Cl.
CPC ............... *B29C 45/572* (2013.01); *B29C 45/77* (2013.01); *B29C 45/80* (2013.01);
(Continued)

(58) Field of Classification Search
CPC ...... B29C 45/572; B29C 45/77; B29C 45/80; B29C 45/76; B29C 45/762; B29C 45/7653
USPC .............................................. 264/40.5, 328.1
See application file for complete search history.

(56) References Cited

U.S. PATENT DOCUMENTS 4,826,641 A * 5/1989 Takeda et al. ................. 264/40.5
5,176,859 A * 1/1993 Leffew .................. B29C 45/561
264/328.11
(Continued)

FOREIGN PATENT DOCUMENTS

EP 0649721 A1 * 4/1995
JP 2-147224 A 6/1990
(Continued)

*Primary Examiner* — Joseph S. Del Sole
*Assistant Examiner* — John Robitaille
(74) *Attorney, Agent, or Firm* — Birch, Stewart, Kolasch & Birch, LLP

(57) ABSTRACT

In performing molding by injecting and filling a resin by an injecting device with a predetermined injection pressure into a mold formed of a fixed mold and a movable mold clamped by a clamping device with a predetermined clamping force, at least a clamping device which enables natural compression of the resin with solidification of the resin in the mold is used as the clamping device, a molding injection pressure and a molding clamping force with which a predetermined mold gap is generated between the movable mold and the fixed mold in injection and filling and a non-defective product can be molded are acquired and set in advance, the clamping device is clamped with the molding clamping force during production, the molding injection pressure is set as a limit pressure, and after the resin is injected and filled in the mold by driving the injecting device.

13 Claims, 9 Drawing Sheets

(51) Int. Cl.
  *B29C 45/77* (2006.01)
  *B29C 45/80* (2006.01)
(52) U.S. Cl.
  CPC ........... *B29C 2945/76006* (2013.01); *B29C 2945/76096* (2013.01); *B29C 2945/76287* (2013.01); *B29C 2945/76404* (2013.01); *B29C 2945/76946* (2013.01)

(56) References Cited

U.S. PATENT DOCUMENTS

| 6,328,916 | B1* | 12/2001 | Nishikawa et al. | 264/53 |
| 2005/0151288 | A1* | 7/2005 | Hakoda et al. | 264/40.5 |
| 2009/0087510 | A1* | 4/2009 | Hakoda et al. | 425/149 |
| 2009/0263530 | A1* | 10/2009 | Hakoda et al. | 425/149 |

FOREIGN PATENT DOCUMENTS

| JP | 5-345342 A | 12/1993 |
| JP | 6-064010 A | 3/1994 |
| JP | 6-198694 A | 7/1994 |
| JP | 8-066951 A | 3/1996 |
| JP | 9-085793 A | 3/1997 |
| JP | 9-094856 A | 4/1997 |
| JP | 9-314622 A | 12/1997 |
| JP | 2004-255571 A | 9/2004 |
| JP | 2008-201016 A | 9/2008 |
| JP | 2009-255440 A | 11/2009 |

* cited by examiner

| CLAMPING FORCE [kN] | MOLDING GAP [mm] | REMAINING GAP [mm] | BUR | SINK MARK | WARPING | DEGASSING | |
|---|---|---|---|---|---|---|---|
| 40 | 0 | 0 | ◎ | ▲▲ | ▲ | ▲ | |
| 35 | 0 | 0 | ◎ | ▲▲ | ▲ | ▲ | |
| 30 | 0 | 0 | ◎ | ▲▲ | ▲ | △ | |
| 25 | 0.01 | 0 | ◎ | ▲ | △ | △ | |
| 20 | 0.02 | 0 | ◎ | △ | △ | ◎ | |
| 18 | 0.03 | 0 | ◎ | ◎ | ◎ | ◎ | ⎫ Zu |
| 16 | 0.1 | 0.01 | ◎ | ◎ | ◎ | ◎ | |
| 15 | 0.15 | 0.02 | ◎ | ◎ | ◎ | ◎ | |
| 14 | 0.17 | 0.03 | ◎ | ◎ | ◎ | ◎ | |
| 13 | 0.2 | 0.04 | ○ | ◎ | ◎ | ◎ | |
| 12 | 0.3 | 0.1 | △ | ◎ | ◎ | ◎ | ⎭ Zus |
| 11 | 0.4 | 0.3 | ▲ | ◎ | ◎ | ◎ | |
| 10 | 0.5 | 0.4 | ▲▲ | ◎ | ◎ | ◎ | |

(a)                                                 (b)

Lmta : MOLD POSITION 0.8 [mm], CLAMPING FORCE 30 [%], NON-LOCK-UP STATE
Lmtb : MOLD POSITION 0.5 [mm], CLAMPING FORCE 30 [%], NON-LOCK-UP STATE
Lmtu : MOLD POSITION  0 [mm], CLAMPING FORCE 30 [%], LOCK-UP STATE

MOLDING METHOD OF INJECTION MOLDING MACHINE

TECHNICAL FIELD

The present invention relates to a molding method of an injection molding machine which performs molding by injecting and filling resin from an injecting device into a mold clamped by a clamping device.

BACKGROUND ART

In usual injection molding methods excluding molding methods such as an injection compression molding method using a basically different molding principle, application of a high-pressure clamping force to a mold for clamping has been a so-called molding method of a common practice. On the other hand, from a viewpoint of global environmental protection such as emission reduction of carbon dioxide, resource saving and the like, energy-saving is in demand for industrial machines such as injection molding machines.

Thus, in order to respond to such a demand, the applicant has already proposed in Japanese Patent Laid-Open No. 2007-118349 an injection molding method with which the demand for energy-saving from the viewpoint of global environmental protection such as emission reduction of carbon dioxide, resource saving and the like can be satisfied by applying a pressure in a required amount at required time to a mold and which has an advantage that degassing in the mold during molding can be performed reliably and stably and the like. This injection molding method is configured such that in injection molding by injecting and filling a molten resin from an injecting device into a mold having a fixed mold and a movable mold supported by a mold opening/closing device, a gap (set interval) is set between the fixed mold and the movable mold into which the molten resin does not enter in the injection molding in advance, the mold is closed in a state in which the gap on the basis of the set interval is provided, and the molten resin is injected and filled into this mold from the injecting device, and also, position control of the movable mold is executed so that the set gap is fixed at least during the injection and filling.

CITATION LIST

Patent Literature

Patent Document 1: Japanese Patent Laid-Open No. 2007-118349

SUMMARY OF INVENTION

Technical Problem

However, prior-art injection molding methods for an injection molding machine including the above-described injection molding method of Japanese Patent Laid-Open No. 2007-118349 has the following problems to be solved.

First, basically, since clamping conditions of the clamping device is set as a fixed condition and injection conditions of the injecting device are set on the basis of the fixed condition, even if the injection conditions are set accurately and appropriately, the resin filled in the mold is subjected to temperature fluctuation or the like in the mold or a clamping mechanism and a quality and homogeneity of a final molding product are also influenced. Particularly in the case of resin having characteristics easily subjected to a temperature, a pressure and the like, this problem becomes serious, and there has been a room for improvement from a viewpoint of ensuring a high molding quality.

Secondly, since the molding conditions are set mainly on the injecting device side, various molding conditions including injection conditions requiring accuracy such as an injection speed, a speed-switching position, a speed/pressure switching position, an injection pressure, a dwelling force and the like and measurement conditions for measured values requiring accurate measurement and the like need to be set. Therefore, a setting work for the molding conditions is not easy and operation control during molding is also complicated. Moreover, since a series of control including multi-stage control for injection speeds and control for dwelling and the like are usually executed, the molding cycle time tends to be longer, and there has been a limit in reduction of the molding cycle time and moreover, improvement of mass production capability.

The present invention has an object to provide a molding method of an injection molding machine which solves the problems in the background arts.

Solution to Problem

A molding method of an injection molding machine M according to the present invention is so configured that, in order to solve the above-described problems, when molding is performed by injecting and filling a resin R by an injecting device with a predetermined injection pressure into a mold 2 formed of a fixed mold 2c and a movable mold 2m clamped by a clamping device with a predetermined clamping force, at least a clamping device Mc which enables compression (natural compression) of the resin R with solidification of the resin R in the mold 2 is used as the clamping device, an injection pressure (hereinafter referred to as a molding injection pressure) Pi and a clamping force (hereinafter referred to as a molding clamping force) Pc with which a predetermined gap (hereinafter referred to as a mold gap) Lm is generated between the movable mold 2m and the fixed mold 2c in injection and filling and a non-defective product can be molded are acquired and set in advance, the clamping device Mc is clamped with the molding clamping force Pc during production, the molding injection pressure Pi is set as a limit pressure Ps, and after the resin R is injected and filled in the mold 2 by driving the injecting device Mi, the molding product G is taken out after predetermined cooling time Tc has elapsed.

In this case, according to a preferred embodiment of the invention, as the clamping device Mc, a direct-pressure type hydraulic clamping device which displaces the movable mold 2m by a driving ram 4 of a clamping cylinder 3 can be used. At this time, for the molding clamping force Pc, a hydraulic pressure Po detected by a pressure sensor 12 in a hydraulic circuit 11 connected to the clamping cylinder 3 can be used, and this molding clamping force Pc can be corrected by the value of an oil temperature To detected by a temperature sensor 13 in the hydraulic circuit 11. On one hand, for the clamping device Mc, a toggle-type clamping device is used in which a movable platen 84 that supports the movable mold 2m is slidably loaded on tie bars 83 . . . extended between a fixed platen 81 that supports the fixed mold 2c and a pressure-receiving platen 82, a toggle-link mechanism 85 is disposed between the pressure-receiving platen 82 and the movable platen 84, and the toggle-link mechanism 85 is driven by a driving mechanism portion 86 so as to open/close the movable mold 2m and the fixed mold 2c so that clamping is performed in a non-lock-up state. The driving mechanism portion 86 can be formed of a ball-screw mechanism 87 that advances/retreats a cross head mh of the toggle-link mechanism 85 and a driving motor 88 that inputs rotation into this ball-screw mechanism 87.

On the other hand, the molding injection pressure Pi and the molding clamping force Pc can be set such that a mold gap (hereinafter referred to as a molding gap) Lmp is 0.03 to 0.30 [mm] when the gap is the maximum between the movable mold 2m and the fixed mold 2c. Also, the molding injection pressure Pi and the molding clamping force Pc can be set such that a predetermined remaining gap Lmr is generated between the movable mold 2m and the fixed mold 2c after cooling time Tc has elapsed, and this remaining gap Lmr can be selected from 0.01 to 0.10 [mm] based on a condition that the value is smaller than the molding gap Lmr. Moreover, the molding injection pressure Pi can be set to a minimum value or a value in the vicinity thereof at which the molding gap Lm is generated between the movable mold 2m and the fixed mold 2c during injection and filling and non-defective products can be molded. On the other hand, a speed limit value VL can be set for an injection speed Vd in the injecting device Mi.

Advantageous Effects of Invention

According to the molding method of the injection molding machine M according to the present invention using the above method, the following marked advantages are exerted.

(1) Since the molding injection pressure Pi and the molding clamping force Pc with which predetermined molding gap Lm is generated in advance between the movable mold 2m and the fixed mold 2c in injection and filling and non-defective products can be molded are acquired and set, the clamping device Mc is clamped with the molding clamping force Pc in production, the molding injection pressure Pi is set as the limit pressure Ps, and the injecting device Mi is driven so as to inject and fill the resin R into the mold 2. And thus, the set molding injection pressure Pi can be given to the resin R filled in the mold 2 all the time. As a result, due to a relative force relationship between the constant molding clamping force Pc and the constant molding injection pressure Pi, the predetermined mold gap Lm can be generated, and even after the injection and filling of the resin R is finished, natural compression by the molding clamping force Pc can be generated, and high quality and homogeneity of a molding product G can be ensured. Therefore, it is optimal for molding of the resin R with low viscosity having characteristics easily subjected to a temperature, a pressure and the like.

(2) Since it is only necessary to set the molding injection pressure Pi and the molding clamping force Pc, setting of various molding conditions including the injection conditions requiring accuracy such as injection speed, speed switching position, speed/pressure switching position, injection pressure, dwelling force and the like which influence each other and measurement conditions requiring accurate measurement such as a measured value and the like are no longer necessary. Therefore, molding conditions can be simplified, setting can be facilitated, and moreover, quality control can be facilitated and operation control during production can be also easily executed. Furthermore, a series of control including multi-stage control for injection speeds and control for dwelling and the like are no longer necessary, and thus, the molding cycle time can be reduced, and mass productivity and economic efficiency can be improved.

(3) According to the preferred embodiment, by using a direct-pressure type hydraulic clamping device which displaces the movable mold 2m by the driving ram 4 of the clamping cylinder 3 for the clamping device Mc, natural compression can be caused in the resin R in the mold 2 by directly using hydraulic behavior of the clamping device Mc itself, and thus, favorable natural compression can be reliably realized and contribution can be made to facilitation of control.

(4) According to the preferred embodiment, by using the hydraulic pressure Po detected by the pressure sensor 12 in the hydraulic circuit 11 connected to the clamping cylinder 3 for the molding clamping force Pc, setting relating to the molding clamping force Pc can be made easily. Also, since accurate setting of the molding clamping force Pc as an absolute value is no longer necessary, operation control with high accuracy and fewer error factors can be executed.

(5) According to the preferred embodiment, by correcting the molding clamping force Pc by the value of the oil temperature To detected by the temperature sensor 13 in the hydraulic circuit 11, an influence of the oil temperature To caused by temperature drift and the like can be eliminated, and the molding clamping force Pc can be maintained constant all the time. Therefore, operation control with further higher accuracy and stability can be realized, and contribution can be made to high quality and homogeneity of the molding product G.

(6) According to the preferred embodiment, for the clamping device Mc, by using a toggle-type clamping device Mc in which the movable platen 84 that supports the movable mold 2m is slidably loaded on tie bars 83 ... extended between the fixed platen 81 that supports the fixed mold 2c and the pressure-receiving platen 82, the toggle-link mechanism 85 is disposed between the pressure-receiving platen 82 and the movable platen 84, and the toggle-link mechanism 85 is driven by the driving mechanism portion 86 so as to open/close the movable mold 2m and the fixed mold 2c so that clamping is performed in a non-lock-up state, natural compression can be realized by clamping in the non-lock-up state even with the toggle-type clamping device Mc that cannot realize natural compression in the original use mode, and the molding method according to the present invention can be realized. And also, various working effects described above on the basis of the molding method can be enjoyed.

(7) According to the preferred embodiment, by configuring the driving mechanism portion 86 with the ball-screw mechanism 87 that advances/retreats the cross head mh of the toggle-link mechanism 85 and the driving motor 88 that inputs rotation into this ball-screw mechanism 87, the molding method according to the present invention can be put into practice not only in the hydraulic clamping device Mc but also in the electric clamping device Mc, and thus, general versatility and expansibility (applicability) can be improved.

(8) According to the preferred embodiment, by setting the molding injection pressure Pi and the molding clamping force Pc such that the molding gap Lmp is 0.03 to 0.30 [mm] when the gap is the maximum between the movable mold 2m and the fixed mold 2c, optimization can be realized easily and reliably from the viewpoint of eliminating defective moldings and ensuring favorable degassing.

(9) According to the preferred embodiment, by setting the molding injection pressure Pi and the molding clamping force Pc such that the predetermined remaining gap Lmr is generated between the movable mold 2m and the fixed mold 2c after the cooling time Tc has elapsed, natural compression for the resin R in a cavity of the mold 2 can be performed reliably.

(10) According to the preferred embodiment, by selecting the remaining gap Lmr from 0.01 to 0.10 [mm] based on a condition that the value is smaller than the molding gap Lmr, optimization can be realized easily and reliably from the viewpoint of ensuring high quality and homogeneity in the molding product G.

(11) According to the preferred embodiment, by setting the molding injection pressure Pi value to a minimum value or a value in the vicinity thereof at which the molding gap Lm is generated between the movable mold 2m and the fixed mold 2c during injection and filling and non-defective products can be molded, the molding clamping force Pc can be also set to the minimum value or the value in the vicinity thereof, and thus, optimal performance from the viewpoint of improvement in the energy saving properties can be obtained, and protection and proliferation of mechanical components and the like can be accomplished.

(12) According to the preferred embodiment, by setting the speed limit value VL for the injection speed Vd in the injecting device Mi, even if the injection speed Vd becomes excessively high, mechanical protection for the mold 2, a screw and the like can be realized.

EXPLANATION OF REFERENCE NUMERALS

2: mold, 2c: fixed mold, 2m: movable mold, 3: clamping cylinder, 4: driving ram, 11: hydraulic circuit, 12: pressure sensor, 13: temperature sensor, 81: fixed platen, 82: pressure-receiving platen, 83 . . . : tie bar, 84: movable platen, 85: toggle-link mechanism, 86: driving mechanism portion, 87: ball-screw mechanism, 88: driving motor, M: injection molding machine, Mc: clamping device, Mi: injecting device, R: resin, Lm: predetermined gap (mold gap), Lmp: mold gap (molding gap) at the maximum, Lmr: remaining gap, Pi: molding injection pressure, Pc: molding clamping force, Ps: limit pressure, G: molding product, Vd: injection speed, VL: speed limit value, mh: cross head.

DESCRIPTION OF EMBODIMENTS

Subsequently, a preferred embodiment according to the present invention will be described in detail on the basis of the attached drawings.

First, a configuration of an injection molding machine M that can put the molding method according to the present invention into practice will be described by referring to FIGS. 3 and 4.

Figure 3:
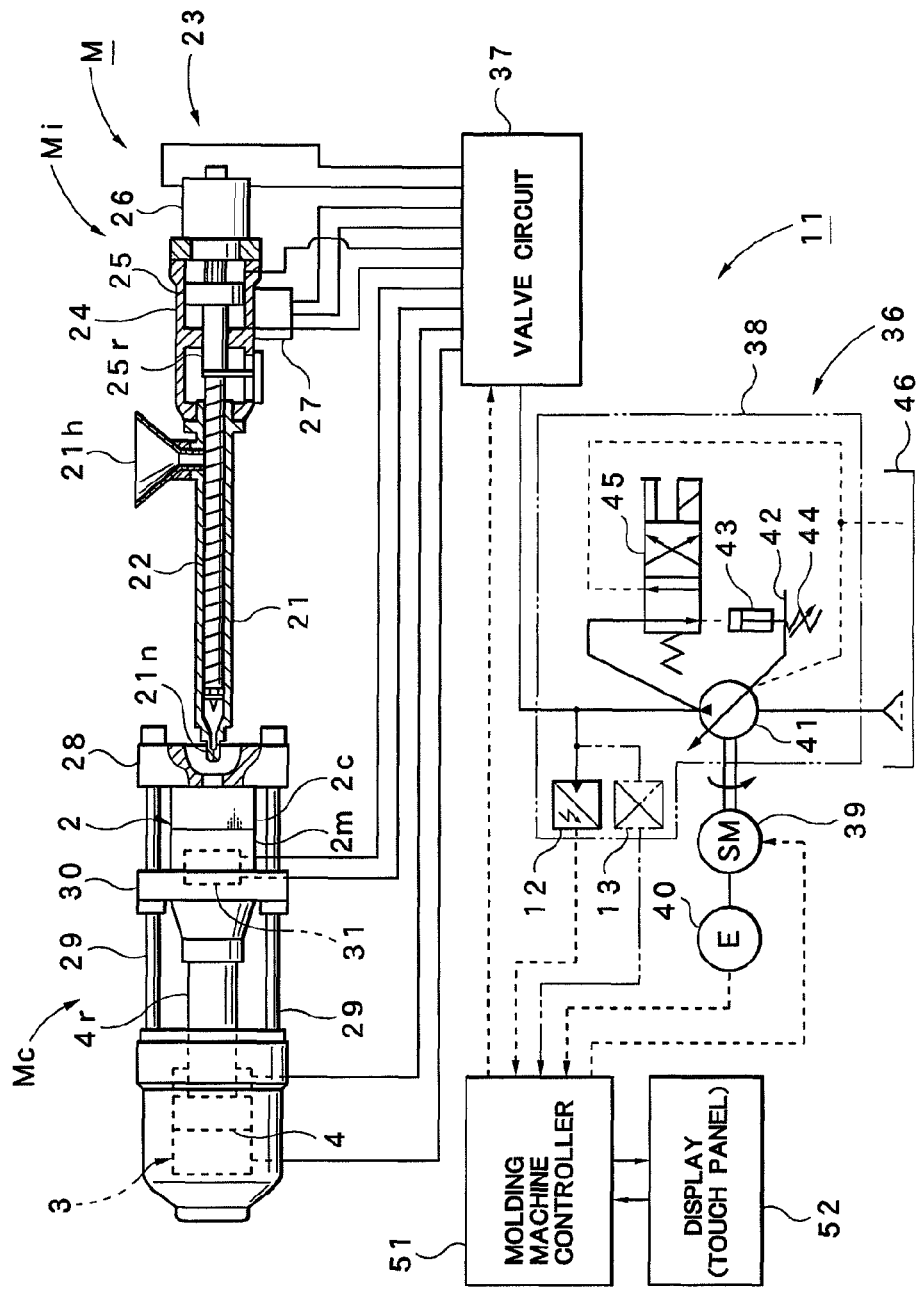
FIG. 3 is a configuration diagram of an injection molding machine provided with a direct-pressure type hydraulic clamping device used in practicing of the molding method.

In FIG. 3, reference character M denotes an injection molding machine and is provided with an injecting device Mi and a clamping device Mc. The injecting device Mi is provided with a heating cylinder 21 having an injection nozzle 21n on the front end and a hopper 21h on a rear part, respectively, and a screw 22 is inserted into this heating cylinder 21, while a screw driving portion 23 is disposed on the rear end of the heating cylinder 21. The screw driving portion 23 is provided with an injection cylinder (hydraulic cylinder) 24 incorporating an injection ram 25 of a single-rod type, and a ram rod 25r projecting forward of the injection ram 25 is connected to the rear end of the screw 22. Also, on the rear end of the injection ram 25, a shaft of a measuring motor (oil motor) 26 mounted on the injection cylinder 24 is spline-connected. Reference numeral 27 denotes an injection-device moving cylinder that performs nozzle-touch or cancellation thereof with respect to the mold 2 by advancing/retreating the injecting device Mi. As a result, the injecting device Mi can bring the injection nozzle 21n into nozzle-touch with the mold 2 and inject and fill the molten (plasticized) resin R into the cavity in the mold 2.

Figure 7:
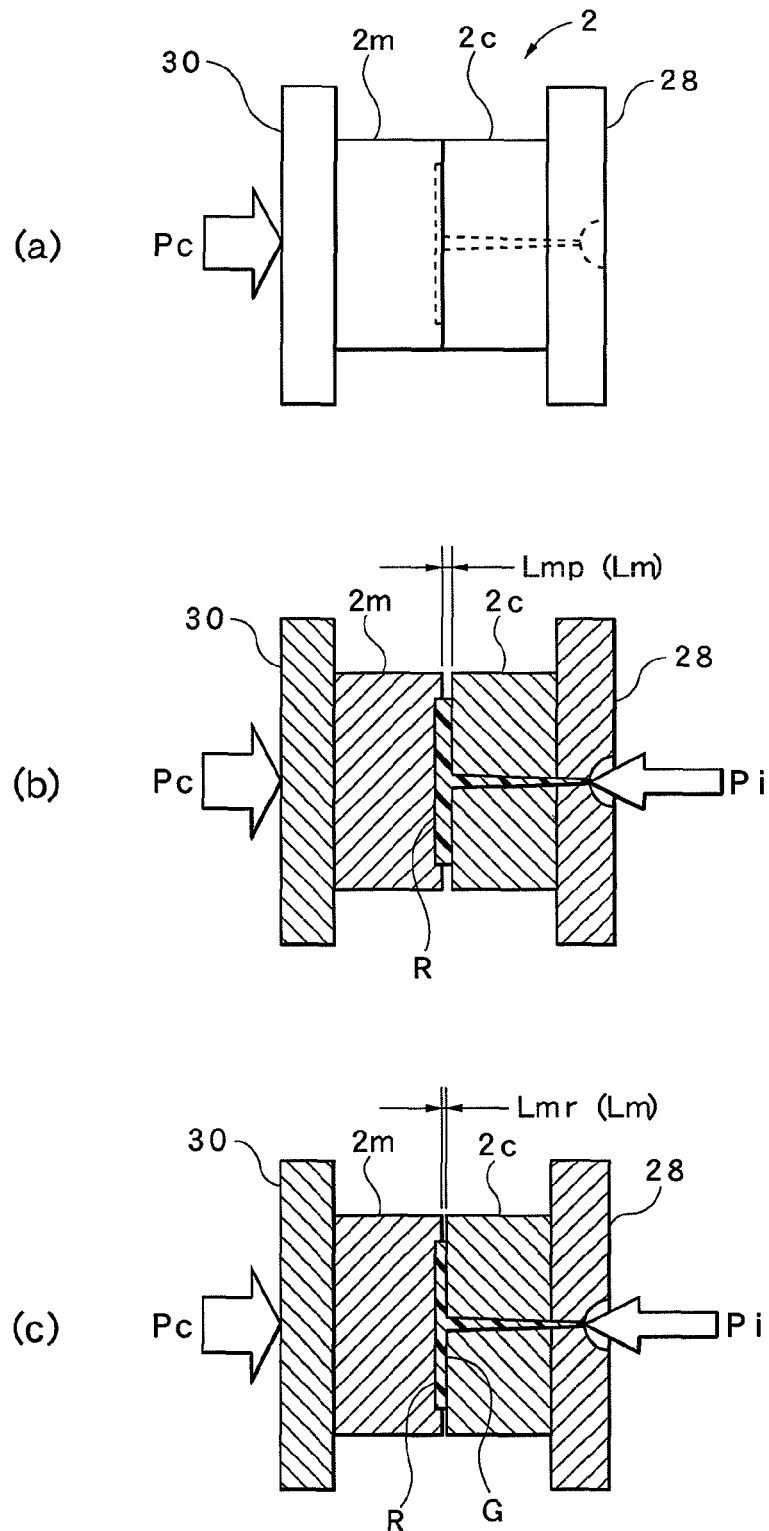
FIG. 7 are schematic diagrams illustrating states of a mold of the molding method.

On one hand, for the clamping device Mc, a direct-pressure type hydraulic clamping device which displaces the movable mold 2m by the driving ram 4 of a clamping cylinder (hydraulic cylinder) 3 is used. By using such a hydraulic clamping device for the clamping device Mc, the movable mold 2m can be displaced by an injection pressure during injection and filling and required mold gaps Lm (Lmp, Lmr) can be generated. The clamping device Mc has a fixed platen 28 and the clamping cylinder 3 arranged at fixed positions and separately from each other and also has a movable platen 30 slidably loaded on a plurality of tie bars 29 . . . extended between the fixed platen 28 and the clamping cylinder 3, and the distal end of a ram rod 4r projecting forward from the driving ram 4 of the clamping cylinder 3 is fixed to the movable platen 30. Also, the fixed mold 2c is mounted on the fixed platen 28, and the movable mold 2m is mounted on the movable platen 30. The fixed mold 2c and the movable mold 2m constitute the mold 2. As a result, the clamping cylinder 3 can perform mold opening/closing and clamping with respect to the mold 2. Reference numeral 31 denotes an ejecting cylinder that ejects the molding product G (FIG. 7) adhering to the movable mold 2m when the mold 2 is opened.

On the other hand, reference numeral 11 denotes a hydraulic circuit and is provided with a variable-discharge-type hydraulic pump 36 which becomes a hydraulic driving source and a valve circuit 37. The hydraulic pump 36 is provided with a pump portion 38 and a servomotor 39 that rotates and drives the pump portion 38. Reference numeral 40 denotes a rotary encoder that detects the rotation speed of the servomotor 39. Also, the pump portion 38 incorporates a pump main body 41 formed of a swash-plate-type piston pump. Therefore, the pump portion 38 is provided with a swash plate 42, and by increasing an inclination angle (swash plate angle) of the swash plate 42, a stroke of the pump piston in the pump main body 41 is increased, and a discharge flow rate is increased. Also, by decreasing the inclination angle, the stroke of the pump piston is decreased, and the discharge flow rate is decreased. Thus, by setting the swash plate angle to a predetermined angle, a fixed discharge flow rate at which the discharge flow rate (maximum capacity) is fixed to a predetermined value can be set. The swash plate 42 is attached with a control cylinder 43 and a return spring 44, and the control cylinder 43 is connected to an outlet of the pump portion 38 (pump main body 41) through a switching valve (electromagnetic valve) 45. As a result, by controlling the control cylinder 43, the angle (swash plate angle) of the swash plate 42 can be changed.

Moreover, an inlet of the pump portion 38 is connected to an oil tank 46, and the outlet of the pump portion 38 is connected to the primary side of the valve circuit 37. Furthermore, the secondary side of the valve circuit 37 is connected to the injection cylinder 24, the measuring motor 26, the clamping cylinder 3, the ejecting cylinder 31, and the injection-device moving cylinder 27 in the injection molding machine M. Therefore, the valve circuit 37 is provided with switching valves (electromagnetic valves) connected to the injection cylinder 24, the measuring motor 26, the clamping cylinder 3, the ejecting cylinder 31, and the injection-device moving cylinder 27, respectively. Each switching valve is formed of one or two or more valve components, required attached hydraulic components and the like and has a switching function relating at least to supply, stop and discharge of operating oil to the injection cylinder 24, the measuring motor 26, the clamping cylinder 3, the ejecting cylinder 31, and the injection-device moving cylinder 27.

As a result, by variably controlling the rotation speed of the servomotor 39, the discharge flow rate and discharge pressure of the variable-discharge-type hydraulic pump 36 can be varied, and driving control of the injection cylinder 24, the measuring motor 26, the clamping cylinder 3, the ejecting cylinder 31, and the injection-device moving cylinder 27 can be executed on the basis of that, and also, each operation process in the molding cycle can be controlled. By using the variable-discharge-type hydraulic pump 36 for which a fixed discharge flow rate can be set by changing the swash plate angle, the pump capacity can be set to a fixed discharge flow rate (maximum capacity) at a predetermined value and the discharge flow rate and discharge pressure can be varied on the basis of the fixed discharge flow rate, and control by the control system can be executed easily and smoothly.

On the other hand, reference numeral 51 denotes a molding machine controller and is attached with a display 52. The display 52 is attached with a touch panel, and various setting operations and selection operations can be performed by using this touch panel. The above-described servomotor 39 is connected to a servo amplifier 53 (FIG. 4) incorporated in the molding machine controller 51, and the valve circuit 37 is connected to a control-signal output port of the molding machine controller 51. Also, the rotary encoder 40 is connected to an input port of the molding machine controller 51. Moreover, to the primary side of the valve circuit 37 in the hydraulic circuit 11, the pressure sensor 12 that detects a hydraulic pressure is connected and the temperature sensor 13 that detects an oil temperature is connected, and the pressure sensor 12 and the temperature sensor 13 are connected to the control-signal output port of the molding machine controller 51.

Figure 4:
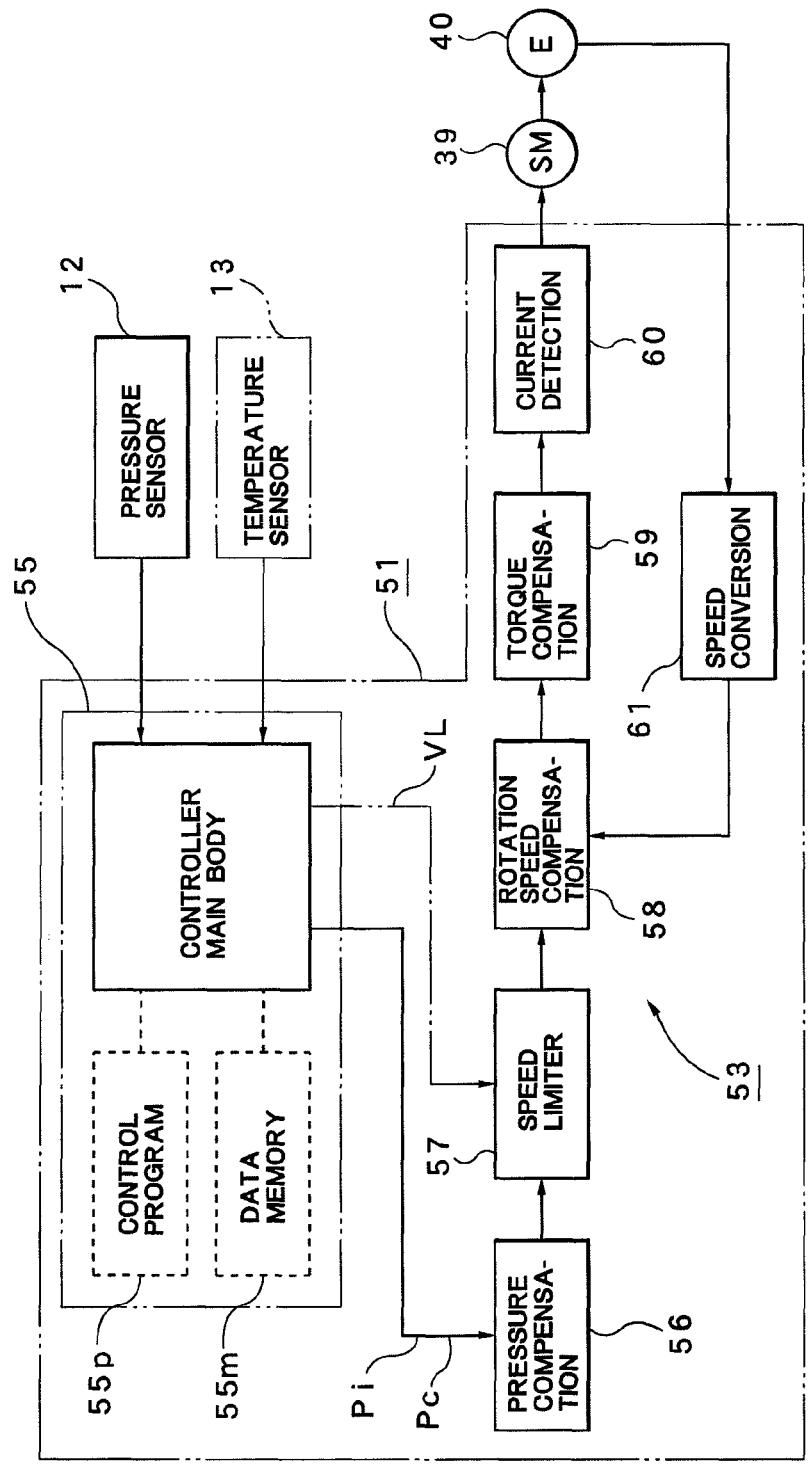
FIG. 4 is a block system diagram of a control system in an essential part of the injection molding machine.

The molding machine controller 51 includes a controller main body 55 and the above-described servo amplifier 53 as essential parts as illustrated in FIG. 4. The controller main body 55 is provided with a computer function incorporating hardware such as a CPU, internal memory and the like. Therefore, a control program (software) 55$p$ for executing various calculation processing and various control processing (sequence control) is stored in the internal memory, and data memory 55$m$ that stores various types of data (databases) is included. In the control program 55$p$, a control program that realizes at least a part of the molding method according to this embodiment is included. Also, the servo amplifier 53 is provided with a pressure compensation portion 56, a speed limiter 57, a rotation-speed compensation portion 58, a torque compensation portion 59, a current detection portion 60, and a speed conversion portion 61, the molding injection pressure Pi (limit pressure Ps) or the molding clamping force Pc is given from the controller main body 55 to the pressure compensation portion 56, and the speed limit value VL is given to the speed limiter 57. As a result, a speed instruction value subjected to pressure compensation is outputted from the pressure compensation portion 56 and given to the speed limiter 57. This speed instruction value is limited by the limit pressure Ps, and the speed instruction value outputted from the speed limiter 57 is limited by the speed limit value VL. Moreover, the speed instruction value outputted from the speed limiter 57 is given to the rotation-speed compensation portion 58, and a torque instruction value outputted from this rotation-speed compensation portion 58 is given to the torque compensation portion 59. And a motor driving current outputted from the torque compensation portion 59 is supplied to the servomotor 39, whereby the servomotor 39 is driven. An encoder pulse obtained from the rotary encoder 40 is converted by the speed conversion portion 61 to a speed detection value and given to the rotation-speed compensation portion 58, whereby feedback control of a minor loop is executed for the rotation speed.

Subsequently, the molding method according to this embodiment will be described according to the flowcharts illustrated in FIGS. 1 and 2 by referring to FIGS. 3 to 9.

First, the outline of the molding method according to this embodiment is as follows:

(A) The molding clamping force Pc and the molding injection pressure Pi used in production are acquired in advance and set as molding conditions. At this time, it is conditional that (x) the appropriate mold gap (natural gap) Lm is generated between the fixed mold 2$c$ and the movable mold 2$m$ in injection molding; and (y) no molding defects such as burs, sink marks, warping and the like occur in the molding product G.

Also, it is conditional that the natural gap Lm satisfies each of the following allowable ranges, considering degassing and compression (natural compression) of the resin R, the molding gap Lmp, which becomes a mold gap at the maximum, and the remaining gap Lmr, which is the mold gap after the cooling time Tc has elapsed, (xa) The molding gap Lmp is 0.03 to 0.30 [mm]; and (xy) The remaining gap Lmr is 0.01 to 0.10 [mm].

(B) The resin R is simply injected under the molding conditions that clamping is performed with the set molding clamping force Pc and that the molding injection pressure Pi is set to the limit pressure in production.

Therefore, according to the above molding method, the natural gap Lm is generated and natural compression (Lm−Lr) occurs in the mold 2 in injection and filling. As a result, even if the behavior of the resin R injected and filled by the injecting device Mi is unstable, the clamping device Mc adapts to the unstable behavior of the resin R, and the molding product G having high quality and homogeneity can be obtained.

Subsequently, specific processing procedures will be described. First, the molding injection pressure Pi and the molding clamping force Pc, which are the molding conditions, are acquired and set as the molding conditions. FIG. 1 illustrates a flowchart for explaining the processing procedures for acquiring and setting the molding injection pressure Pi and the molding clamping force Pc.

First, the injection pressure, which is an injection condition on the injecting device Mi side, is initially set. As the injection pressure at this time, the injection pressure on the basis of the capacity (driving force) of the injecting device Mi can be set (Step S1). In this case, the injection pressure can be acquired from the hydraulic pressure Po detected by the pressure sensor 12 in the hydraulic circuit 11 connected to the injection cylinder 24. Since the injection pressure does not have to be acquired accurately as an absolute value, the value of the detected hydraulic pressure Po may be used or it may be converted to the injection pressure by calculation and used. Also, the clamping force, which is the clamping condition on the clamping device Mc side, is initially set. As the clamping force at this time, a clamping force on the basis of the capacity (driving force) of the clamping device Mc can be set (Step S2). In this case, the clamping force can be acquired from the hydraulic pressure Po detected by the pressure sensor 12 in the hydraulic circuit 11 connected to the clamping cylinder 3. Since the clamping force does not have to be acquired accurately as an absolute value, the value of the detected hydraulic pressure Po may be used or it may be converted to the clamping force by calculation and used. The hydraulic circuit 11 is switched by the valve circuit 37 and functions as a hydraulic circuit on the clamping device Mc side in clamping and functions as a hydraulic circuit on the injecting device Mi side in injection. By using such hydraulic pressure Po as the injection pressure and the clamping force, the settings relating to the molding clamping force Pc and the molding injection pressure Pi can be made easily. Moreover, since accurate settings of the molding clamping force Pc and the molding injection pressure Pi as absolute values are no longer necessary, operation control with fewer error factors and high accuracy can be executed.

Figures 5, 6:
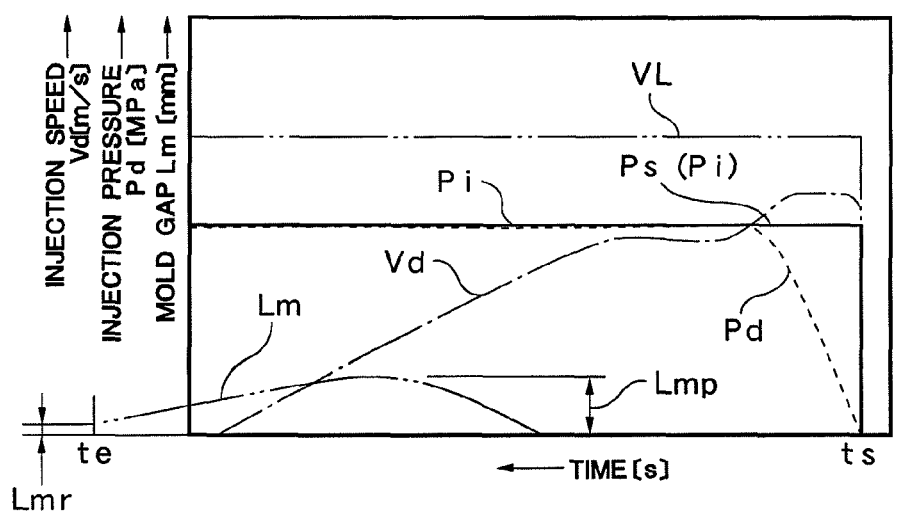
FIG. 5 is a data table indicating acceptable or not of molding products with respect to a clamping force for explaining processing in setting of the molding method.
FIG. 6 is a change characteristics diagram of an injection pressure, an injection speed, and a mold gap with respect to time in production of the molding method.

Subsequently, by executing optimization processing for the initially set clamping force, the molding clamping force Pc used in production is acquired, and by executing optimization processing for the initially set injection pressure, the molding injection pressure Pi used in production is acquired (Steps S3 and S4). An example of the method of optimizing the clamping force and the injection pressure will be described by referring to FIG. 5. In the case of the exemplification, the initially set clamping force is 40 [kN]. As the result obtained by performing trial molding using the initially set clamping force and injection pressure, as illustrated in FIG. 5, the molding gap Lmp and the remaining gap Lmr are both zero. That is, since the clamping force is large, no bur occurs (⊚), and evaluations on sink mark, warping, and degassing are all defective (▲▲▲).

The magnitudes of the clamping force and injection pressure are lowered in steps as illustrated in FIG. 5, and trial molding is performed at each step and the mold gap Lm (Lmp, Lmr) between the fixed mold 2c and the movable mold 2m is measured and the acceptable state of the molding product G is observed (Steps S5 and S6). FIG. 5 shows the results.

In FIG. 5, there is no data on the injection pressure, but with regard to optimization of the injection pressure, the settable minimum value or a value in the vicinity thereof can be set as the molding injection pressure Pi on the condition that the molding gap Lm is generated between the movable mold 2m and the fixed mold 2c in injection and filling and non-defective molding can be obtained. Therefore, specifically, as illustrated in FIG. 5, the magnitude before the injection pressure is changed (lowered) when the clamping force is changed (lowered) and the resin R is not normally filled in the mold 2 can be selected as appropriate. By selecting such a minimum value or a value in the vicinity thereof as the molding injection pressure Pi, the molding clamping force Pc can be also set to the minimum value or the value in the vicinity thereof with that, and optimal performance from the viewpoint of improvement in energy saving can be obtained, and protection and proliferation of mechanism components and the like can be realized. The acquired molding injection pressure Pi is set as the limiter pressure Ps to the injection pressure in production (Step S7).

On the other hand, at the clamping forces 14, 15, and 16 [kN] surrounded by a virtual line frame Zu in each step in FIG. 5, the molding gap Lmp and the remaining gap Lmr both satisfy the allowable ranges. That is, the molding gap Lmp satisfies the allowable range of 0.03 to 0.30 [mm] and further satisfies the allowable range of 0.03 to 0.20 [mm]. Also, the remaining gap Lmr satisfies the allowable range of 0.01 to 0.10 [mm] and further satisfies the allowable range of 0.01 to 0.04 [mm]. Moreover, none of bur, sink mark or warping occurs (⊚) and degassing is performed favorably (⊚), and the condition that a non-defective molding product is obtained is satisfied. Therefore, the molding clamping force Pc can be selected from the three clamping forces 14, 15, and 16 [kN] and set. The selected clamping force is set as the molding clamping force Pc when clamping is performed in production (Step S8).

In the case of FIG. 5, the best molding product without bur can be obtained if the molding gap Lmp satisfies the allowable range of 0.03 to 0.20 [mm] and the remaining gap Lmr satisfies the allowable range of 0.01 to 0.04 [mm], but since the burs can be removed after taking out the molding product and the product can be used in some cases as non-defective even with some burs, occurrence of bur at a low degree indicated by (◯) and (Δ) in FIG. 5 does not immediately result in a defective product. Therefore, considering the results illustrated in FIG. 5, selection of the clamping forces 12, 13 [kN] surrounded by the virtual line frame Zus can be made depending on the type or the like of the molding product G. That is, if the molding gap Lmp satisfies the allowable range of 0.03 to 0.30 [mm] and the remaining gap Lmr satisfies the allowable range of 0.01 to 0.10 [mm], non-defective molding products can be obtained.

FIG. 5 shows experimental data for explaining the setting method of the molding clamping force Pc and the molding injection pressure Pi in the molding method according to this embodiment. Therefore, in actual setting, the target molding clamping force Pc and the molding injection pressure Pi can be acquired by performing changes of the clamping force several times such as 40, 30, 20, 10 and the like. Also, the magnitudes of the clamping force and the injection pressure may arbitrarily be set by an operator or may be acquired automatically or semi-automatically while using an auto-tuning function provided in the injection molding machine M or the like. If the auto-tuning function is used, the clamping force immediately before occurrence of bur can be acquired easily.

On the other hand, the speed limit value VL to the injection speed Vd of the injecting device Mi is set (Step S9). This speed limit value VL does not necessarily have to be set, but by setting it, even if the injection speed Vd becomes excessively high, mechanical protection can be provided for the mold 2, the screw 22 and the like. Therefore, for the speed limit value VL, a value that can give mechanical protection to the mold 2, the screw 22 and the like is set.

Moreover, other required matters are set (Step S10). The exemplified injection molding machine M is provided with a correction function that corrects the molding clamping force Pc by the magnitude of the oil temperature To detected by the temperature sensor 13 in the hydraulic circuit 11. This correction function is a function that eliminates the influence of the oil temperature To caused by temperature drift to the molding clamping force Pc, and since the molding clamping force Pc can be maintained constant all the time, the operation control with further higher accuracy and stability can be realized, and contribution can be made to high quality and homogeneity of the molding product G. Therefore, as setting of the other required matters, a correction coefficient and the like used in correction by the correction function can be applied.

Subsequently, specific processing procedures in production will be described. FIG. 2 illustrates a flowchart for explaining the processing procedures in production using the molding injection pressure Pi and the molding clamping force Pc.

First, by means of switching of the valve circuit 37 and control of the servomotor 39, the measuring motor 26 of the injecting device Mi is driven, the resin R is plasticized and preparations are made for injection (Step S21). In the molding method according to this embodiment, a measuring process in which the resin R is accurately measured as in a general molding method is not necessary. That is, a measuring operation in the general measuring process is performed, but measuring control in order to obtain an accurate measured value is not performed. Rather, the operation is to add the resin R before the resin R becomes insufficient. Also, by means of switching of the valve circuit 37 and control of the servomotor 39, the clamping cylinder 3 of the clamping device Mc is driven, and clamping of the mold 2 is performed such that the clamping force becomes the molding clamping force Pc (Step S22). The state of the mold 2 at this time is illustrated in FIG. 7A.

Subsequently, by means of switching of the valve circuit 37 and control of the servomotor 39, the injection cylinder 24 of the injecting device Mi is driven, and the resin R is injected from an injection start point is illustrated in FIG. 6 (Step S23). In this case, it is only necessary that the screw 21 is advanced by a rated operation, and speed control or pressure control on the screw 21 is not necessary. As a result, the resin R plasticized and molten in the heating cylinder 22 is filled in the cavity of the mold 2 (Step S24). With filling of the resin R, as illustrated in FIG. 6, the injection pressure Pd is raised. If the pressure gets closer to the limit pressure Ps and reaches the limit pressure Ps, control to maintain the pressure at the limit pressure Ps, that is, control to prevent overshoot is executed, and the injection pressure Pd is maintained at the limit pressure Ps (molding injection pressure Pi) (Steps S25 and S26). Therefore, in the injection operation, substantial single-pressure control is executed. In FIG. 6, reference character Vd denotes the injection speed.

Also, since the resin R is filled in the cavity of the mold 2, the mold 2 is pressurized by the resin R, the mold gap Lm is generated between the fixed mold 2c and the movable mold 2m, and the molding gap Lmp is generated at the maximum (Step S27). This molding gap Lmp falls under the allowable range of 0.03 to 0.30 [mm] or preferably in the allowable range of 0.03 to 0.20 [mm] by the molding clamping force Pc and the molding injection pressure Pi set in advance, and favorable degassing is performed, and non-defective molding without defectives is accomplished. The state of the mold 2 at this time is illustrated in FIG. 7B. On the other hand, solidification of the resin R in the cavity of the mold 2 progresses with elapsing of time, and with this solidification, compression (natural compression) of the resin R proceeds (Step S28).

When the set cooling time Tc has elapsed, by means of switching of the valve circuit 37 and control of the servomotor 39, the clamping cylinder 3 is driven, and the movable mold 2m is retreated so as to open the mold, and by means of switching of the valve circuit 37 and control of the servomotor 39, the ejecting cylinder 31 is driven, and the molding product G adhering to the movable mold 2m is ejected (Steps S29 and S30). As a result, the molding product G is taken out, and one molding cycle is finished. The cooling time Tc can be set in advance as elapsed time from the injection start point ts. Also, as illustrated in FIG. 6, at a point to when the cooling time Tc has elapsed, owing to the natural compression of the resin R, the remaining gap Lmr between the fixed mold 2c and the movable mold 2m falls under the allowable range of 0.01 to 0.10 [mm] or preferably the allowable range of 0.01 to 0.04 [mm] by the molding clamping force Pc and the molding injection pressure Pi set in advance, and natural compression to the resin R in the cavity of the mold 2 is reliably accomplished, and high quality and homogeneity in the molding product G are ensured. The state of the mold 2 at this time is illustrated in FIG. 7C.

After that, if the subsequent molding continues, it is only necessary that the resin R is plasticized and preparation for injection is made similarly and then, the processing of clamping, injection, cooling and the like is similarly executed (Steps S31, S21, S22 . . . ).

Thus, according to the molding method of the injection molding machine M according to this embodiment, since it is so configured that the molding injection pressure Pi and the molding clamping force Pc with which the predetermined mold gap Lm is generated between the movable mold 2m and the fixed mold 2c in injection and filling and a non-defective product can be molded are acquired and set in advance, the clamping device Mc is clamped with the molding clamping force Pc, the molding injection pressure Pi is set as the limit pressure Ps in production, and the injecting device Mi is driven so as to perform injection and filling of resin R into the mold 2, the set molding injection pressure Pi can be given all the time to the resin R filled in the mold 2. As a result, the predetermined mold gap Lm can be generated by a relative force relationship between the constant molding clamping force Pc and the constant molding injection pressure Pi, and even after the injection and filling of the resin R is finished, natural compression by the molding clamping force Pc can be generated whereby high quality and homogeneity of the molding product G can be ensured. Therefore, that is optimal for molding of the resin R with low viscosity having characteristics easily subjected to a temperature, a pressure and the like. Particularly, since the direct-pressure type hydraulic clamping device which displaces the movable mold 2m by the driving ram 4 of the clamping cylinder 3 is used as the clamping device Mc, natural compression can be accomplished to the resin R in the mold 2 by directly using the hydraulic behavior of the clamping device Mc itself, whereby favorable natural compression can be reliably accomplished, and contribution can be made to facilitation of control.

Figure 8:
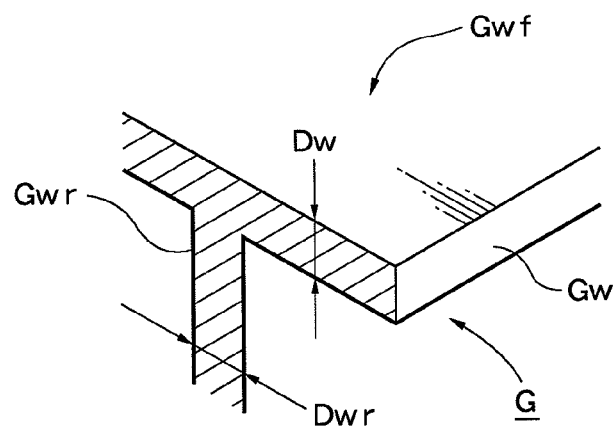
FIG. 8 is a state explanatory diagram of the molding product molded by the molding method.
Figure 9:
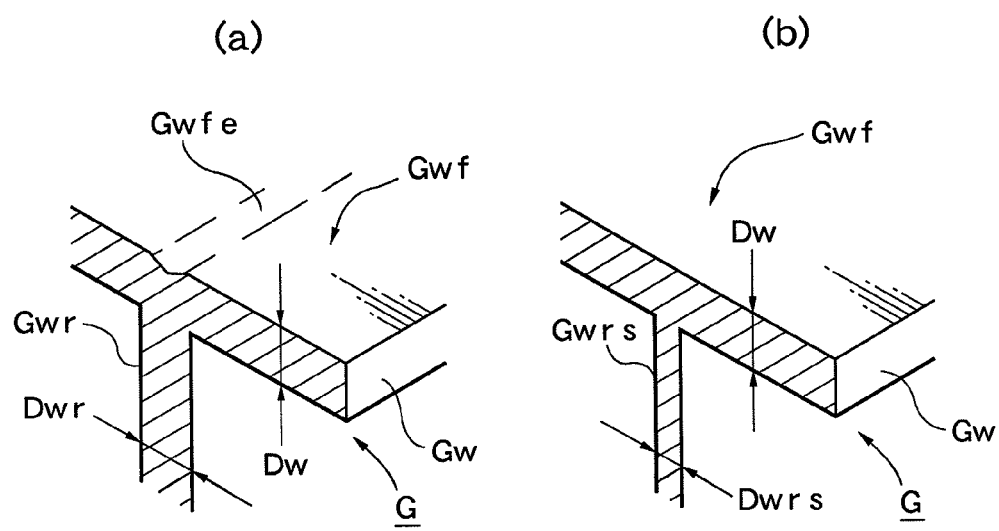
FIG. 9 is a state explanatory diagram of the molding product molded by a molding method according to a background art.

FIG. 8 illustrates a state of the molding product G molded by the molding method according to this embodiment, and FIGS. 9A and 9B illustrate a state of the molding product G molded by a general molding method in which molding is performed without generating the mold gap Lm in the mold 2 as a comparative example. It is assumed that the shape of the molding product G includes a plate portion Gw having a thickness Dw of 2 [mm] and a rib portion Gwr having a thickness Dwr of 2 [mm] provided at a right angle on this plate portion Gw as illustrated in FIG. 8 and FIG. 9. In this case, with the general molding method, as illustrated in FIG. 9A, a recess-shaped sink mark Gwfe along the rib portion Gwr is generated on an upper face Gwf of the plate portion Gw. The reason for that is as follows. Since the volume of the rib portion Gwr is relatively large, if the cavity volume of the mold 2 is maintained constant, the resin R filled in the cavity is solidified, and when the volume is decreased, the decrease appears as the recess-shaped sink mark Gwfe. Therefore, in the general molding method, in order to avoid occurrence of the sink mark Gwfe, as illustrated in FIG. 9B, a rib portion Gwrs needs to be designed with a small thickness Dwrs of approximately 1 [mm], which results in nonconformity that sufficient strength cannot be ensured for the plate portion Gw.

On the other hand, if the molding method according to the present invention is used, as illustrated in FIG. 8, even if the rib portion Gwr having the thickness Dwr of 2 [mm] is provided on the plate portion Gw having the thickness Dw of 2 [mm], since the clamping device Mc is clamped by the molding clamping force Pc, the molding injection pressure Pi is set as the limit pressure Ps, and the resin R is injected into and filled in the mold 2 by driving the injecting device Mi in production, the set molding injection pressure Pi can be given to the resin R filled in the mold 2 all the time, and even after the injection and filling of the resin R is finished, natural compression by the molding clamping force Pc can be generated. Therefore, as illustrated in FIG. 8, the sink mark Gwfe is not generated at all on the upper face Gwf of the plate portion Gw and favorable flatness (planar properties) can be ensured, and high quality and homogeneity of the molding product can be ensured.

Moreover, according to the molding method according to the present invention, since it is only necessary to set the molding injection pressure Pi and the molding clamping force Pc, setting of various molding conditions including the injection conditions requiring accuracy such as injection speed, speed switching position, injection pressure, dwelling force and the like which influence each other and the measurement conditions requiring accurate measurement such as a measured value and the like is no longer necessary. Therefore, molding conditions can be simplified, setting can be facilitated, and moreover, quality control can be facilitated and operation control during production can be also easily executed. Furthermore, a series of control including multi-stage control for injection speeds and control for dwelling and the like are no longer necessary, and thus, the molding cycle time can be reduced, and mass productivity and economic efficiency can be improved.

Subsequently, a molding method of a variation of the embodiment of the present invention will be described by referring to FIGS. 10 and 11.

In the molding method of the variation, as the clamping device Mc of the injection molding machine M, the toggle-type clamping device Mc in which the movable platen 84 that supports the movable mold 2m is slidably loaded on the tie bars 83 . . . extended between the fixed platen 81 that supports the fixed mold 2c and the pressure-receiving platen 82, the toggle-link mechanism 85 is disposed between the pressure-receiving platen 82 and the movable platen 84, and the toggle-link mechanism 85 is driven by the driving mechanism portion 86 so as to open/close the movable mold 2m and the fixed mold 2c, and moreover, clamping is performed in the non-lock-up state.

Figure 10:
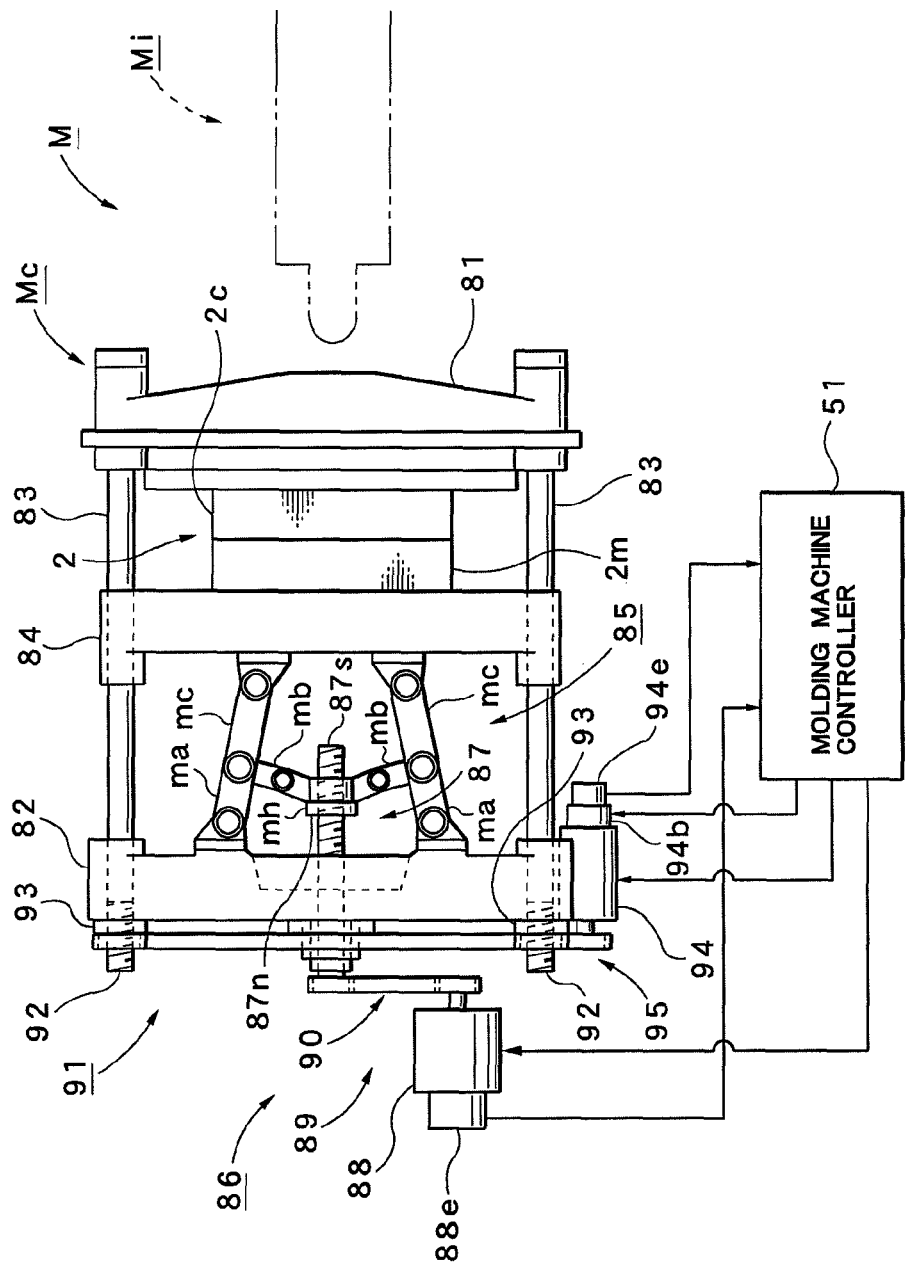
FIG. 10 is a configuration diagram of an injection molding machine provided with a toggle-type clamping device used in the molding method according to a changed embodiment of the present invention.

FIG. 10 illustrates the toggle-type clamping device Mc. This clamping device Mc is provided with the fixed platen 81 and the pressure-receiving platen 82 disposed separately from each other, the fixed platen 81 is fixed on a base, not shown, while the pressure-receiving platen 82 is supported on the base capable of being advanced/retreated. The four tie bars 83 . . . are extended between the fixed platen 81 and the pressure-receiving platen 82, and the front end of each of the tie bars 83 . . . is fixed to the fixed platen 81, and the rear end of each of the tie bars 83 . . . is inserted into the pressure-receiving platen 82. On the other hand, the movable platen 84 is slidably loaded on the tie bars 83 . . . . This movable platen 84 supports the movable mold 2m, while the fixed platen 81 supports the fixed mold 2c, and the movable mold 2m and the fixed mold 2c constitute the mold 2. Moreover, the toggle-link mechanism 85 is disposed between the pressure-receiving platen 82 and the movable platen 84. The toggle-link mechanism 85 has a pair of first links ma and ma pivotally supported on the pressure-receiving platen 82, a pair of output links mc and mc pivotally supported on the movable platen 84, and a pair of second links mb and mb connected to support shafts of the first links ma and ma and the output links mc and mc, and the second links mb and mb are pivotally supported by the cross head mh.

Also, the driving mechanism portion 86 is disposed between the pressure-receiving platen 82 and the cross head mh. The driving mechanism portion 86 is provided with a ball screw portion 87s rotatably supported by the pressure-receiving platen 82 and the ball-screw mechanism 87 screwed with this ball screw portion 87s and having a ball nut portion 87n integrally provided on the cross head mh and is also provided with a rotation driving portion 89 that rotates and drives the ball screw portion 87s. The rotation driving portion 89 is provided with the driving motor 88 using a servomotor, a rotary encoder 88e that is attached to this driving motor 88 and detects the rotation speed of the driving motor 88, and a rotation transmission mechanism portion 90 using a timing belt that transmits rotation of a rotary shaft of the driving motor 88 to the ball screw portion 87s. As a result, by operating the driving motor 88, the ball screw portion 87s is rotated, whereby the ball nut portion 87n is advanced/retreated. As a result, the cross head mh integral with the ball nut portion 87n is advanced/retreated, the toggle-link mechanism 85 is bent or extended, and the movable platen 84 is advanced/retreated in the mold opening direction (retreating direction) or the mold closing direction (advancing direction). As described above, by configuring the driving mechanism portion 86 by the ball screw mechanism 87 that advances and retreats the cross head mh of the toggle-link mechanism 85 and the driving motor 88 that inputs the rotation to this ball screw mechanism 87, the molding method according to the present invention can be similarly executed not only by the hydraulic clamping device Mc but also by the electric clamping device Mc, and thus, general versatility and expansibility (applicability) can be improved.

On the other hand, a mold-thickness adjusting device 91 is attached to the pressure-receiving platen 82. The mold-thickness adjusting device 91 forms screw portions 92 . . . on the rear end sides of the four tie bars 83 . . . and has adjusting nuts 93 . . . screwed with each of the screw portions 92 . . . , respectively. As a result, by rotating each of the adjusting nuts 93 . . . , they are relatively displaced with respect to the screw portions 92 . . . , whereby the pressure-receiving platen 82 can be advanced/retreated. Moreover, on the side face of the pressure-receiving platen 82, a mold-thickness adjusting motor 94 using a geared motor which becomes a driving source for moving the pressure-receiving platen 82 is mounted. This mold-thickness adjusting motor 94 is provided with a motor portion using an induction motor provided in an intermediate part, a speed-reduction gear mechanism into which rotation of the motor portion is inputted by being provided on a first half part, and a motor brake portion 94b that locks or unlocks the position with respect to a motor shaft by being provided on a second half part, and the rotary encoder 94e that detects the rotation speed of the motor shaft is attached to the rear end of the mold-thickness adjusting motor 94. For this mold-thickness adjusting motor 94, open-loop control is executed by the molding machine controller 51. Therefore, position control for a target position is executed in the open-loop control, and if the target position is reached, control is executed so as to stop the mold-thickness adjusting motor 94. On the other hand, the rotation of a rotation-output shaft projecting from a front end face of the mold-thickness adjusting motor 94 is transmitted to each of the adjusting nuts 93 . . . through the rotation transmission mechanism portion 95. As a result, by operating the mold-thickness adjusting motor 94, each of the adjusting nuts 93 . . . is rotated and also advanced/retreated along the screw portions 92 . . . of the tie bars 83 . . . , and thus, the pressure-receiving platen 82 is also advanced/retreated, and its position in the front-and-rear direction is adjusted. Reference numeral 51 denotes a molding machine controller to which the driving motor 88, the rotary encoder 88e, the mold-thickness adjusting motor 94, the motor brake portion 94b, and the rotary encoder 94e are connected.

The molding method according to the variation using the toggle-type clamping device Mc having the above configuration can be put into practice by performing clamping in the non-lock-up state. That is, in the case of the lock-up state, the toggle-link mechanism 85 is, as illustrated in FIG. 10, in the fully extended state, and opening of the mold 2 by the resin pressure basically depends on elongation of the tie bars 83 . . . . Therefore, a mold position X of the movable mold 2m in this lock-up state is set to 0 [mm], the driving motor 88 is driven and controlled so as to bend the toggle-link mechanism 85 and to slightly retreat the position of the movable mold 2m to the mold opening direction, whereby the non-lock-up state is realized, and a back pressure (clamping force) to the movable mold 2m can be controlled by the driving motor 88. In FIG. 11, Lmta indicates a case in which the position X of the movable mold 2m is retreated in the mold opening direction by 0.8 [mm], Lmtb indicates a case in which the position X of the movable mold 2m is retreated in the mold opening direction by 0.5 [mm], and Lmtu indicates a case in which the position X of the movable mold 2m is not retreated but set to 0 [mm], respectively. In this case, Lmta and Lmtb are in the non-lock-up state and Lmtu is in the lock-up state. In any case, the clamping force before filling the resin R is set to 30 [%]. The clamping force can be set only by driving and controlling the mold-thickness adjusting motor 94 of the mold-thickness adjusting device 91 so as to move the pressure-receiving platen 82 forward and by stopping the platen at a position of a clamping margin corresponding to 30[%] of the clamping force.

Figure 1:
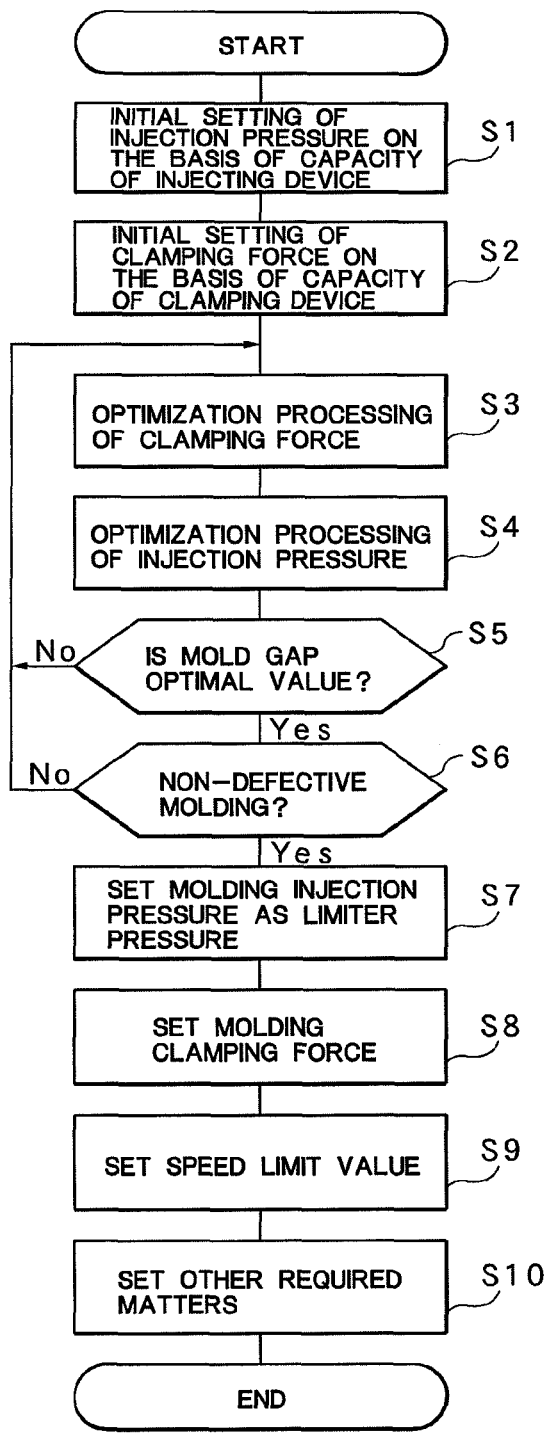
FIG. 1 is a flowchart for explaining processing procedures in setting of a molding method according to a preferred embodiment of the present invention.
Figure 2:
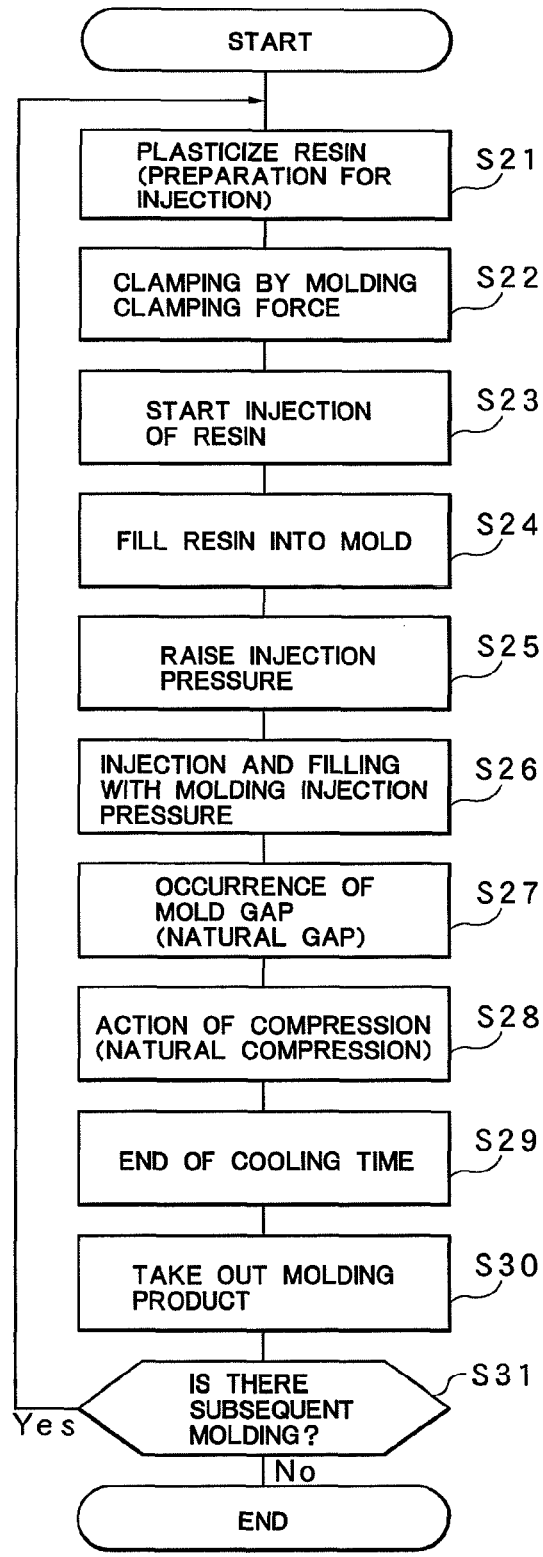
FIG. 2 is a flowchart for explaining processing procedures in production of the molding method.
Figure 11:
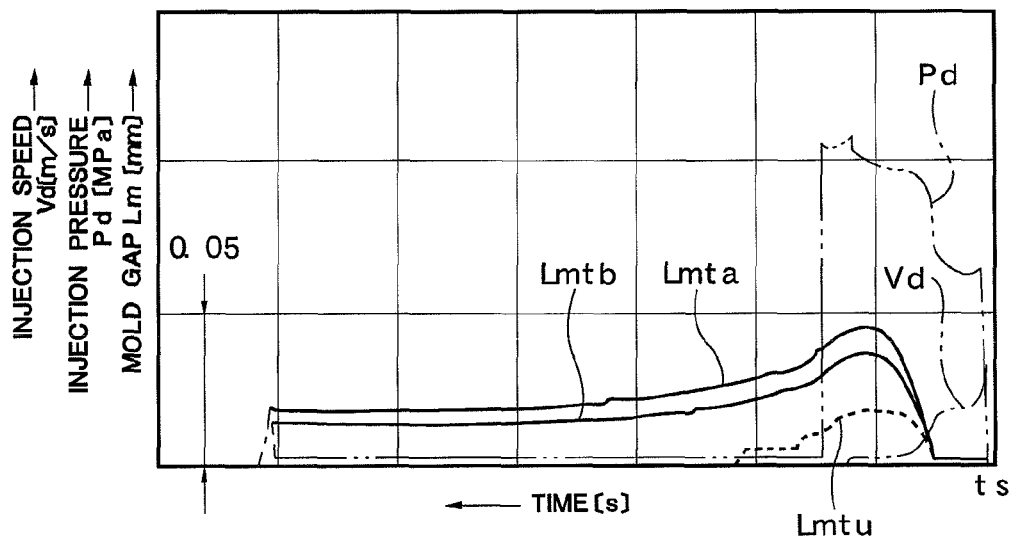
FIG. 11 is a change characteristic diagram of the mold gap with respect to time if the molding method is used.

If injection and filling of the resin R is started under the conditions similar to those in the above-described molding method illustrated in FIGS. 1 and 2 at the point is illustrated in FIG. 11 by using such toggle-type clamping device Mc, as illustrated in FIG. 11, the molding gap Lmp at the maximum becomes approximately 0.02 [mm] at Lmtu, and the remaining gap Lmr is not generated at all. Thus, the conditions for performing the molding method according to the present invention cannot be satisfied. On the other hand, at Lmta and Lmtb, the molding gap Lmp at the maximum exceeds 0.03 [mm] in the both cases and satisfies the allowable range of 0.03 to 0.30 [mm] (or preferably 0.03 to 0.20. [mm]) and the remaining gap Lmr also exceeds 0.01 [mm] and satisfies the allowable range of 0.01 to 0.10 [mm] (or preferably 0.01 to 0.04 [mm]), and thus, the molding method according to the present invention can be realized.

As described above, as the clamping device Mc, by using the toggle-type clamping device Mc in which the movable platen 84 that supports the movable mold 2m is slidably loaded on the tie bars 83 . . . extended between the fixed platen 81 that supports the fixed mold 2c and the pressure-receiving platen 82, the toggle-link mechanism 85 is disposed between the pressure-receiving platen 82 and the movable platen 84, and the toggle-link mechanism 85 is driven by the driving mechanism portion 86 so as to open/close the movable mold 2m and the fixed mold 2c and by performing clamping in the non-lock-up state, even with the toggle-type clamping device Mc that cannot realize natural compression in the original use mode, the natural compression can be realized by performing clamping in the non-lock-up state, whereby the molding method according to the present invention can be realized, and the above-described various working effects on the basis of the molding method can be enjoyed.

The preferred embodiments and the variation have been described in detail, but the present invention is not limited by these embodiments but is capable of arbitrary change, addition or deletion in the configuration, shape, quantity, methods and the like in detail in a range not departing from the gist of the present invention. For example, though it is preferable that the predetermined remaining gap Lmr is generated between the movable mold 2m and the fixed mold 2c after the cooling time Tc has elapsed, the case in which the remaining gap Lmr is not generated is not excluded. Also, the allowable range of 0.03 to 0.30 [mm] for the molding gap Lmp and the allowable range of 0.01 to 0.10 [mm] for the remaining gap Lmr are exemplified, but these ranges are not limiting but can be changed in accordance with the type and the like of a new resin R. Moreover, the molding injection pressure Pi is preferably set to the minimum value at which non-defective molding is possible or a value in the vicinity thereof, but the case of a value other than the minimum value or the value in the vicinity thereof is not excluded. On the other hand, as the molding clamping force Pc, the case in which the hydraulic pressure Po detected by the pressure sensor 12 in the hydraulic circuit 11 connected to the clamping cylinder 3 is used is exemplified, but the hydraulic pressure in the clamping cylinder 3 may be used or a pressure in a mechanism portion of the movable platen (movable mold) or the like may be used.

INDUSTRIAL APPLICABILITY

The molding method according to the present invention can be used for various injection molding machines that perform molding by injecting and filing the resin R from the injecting device Mi into the mold 2 clamped by the clamping device Mc.

The invention claimed is:
1. A molding method of an injection molding machine in which molding is performed by injecting and filling a resin by an injecting device with a predetermined injection pressure into a mold formed of a fixed mold and a movable mold clamped by a clamping device with a predetermined clamping force, wherein:
the clamping device, which enables natural compression of the resin with solidification of the resin in the mold is used, the clamping device is a direct-pressure type hydraulic clamping device which displaces the movable mold by a driving ram of a clamping cylinder, wherein the natural compression results from the following: a molding injection pressure and a molding clamping force are acquired and set in advance, with the molding injection pressure and the molding clamping force a predetermined molding gap is generated between the movable mold and the fixed mold in injection and filling, the clamping device is clamped with the molding clamping force from mold closing to mold opening so that the molding clamping force is maintained constant, the molding injection pressure is set as a limit pressure, and after the resin is injected and filled in the mold by driving the injecting device, the molding product is taken out after predetermined cooling time has elapsed, and in injection and filling of the resin in the mold, after the injection pressure reaches the limit pressure, the injection pressure is controlled to be maintained at the limit pressure.

2. The molding method of an injection molding machine according to claim 1, wherein the molding clamping force is determined by the use of a hydraulic pressure sensor connected to the clamping cylinder.

3. The molding method of an injection molding machine according to claim 2, wherein the molding clamping force is corrected by the magnitude of an oil temperature detected by a temperature sensor in the hydraulic circuit.

4. A molding method of an injection molding machine in which molding is performed by injecting and filling a resin by an injecting device with a predetermined injection pressure into a mold formed of a fixed mold and a movable mold clamped by a clamping device with a predetermined clamping force, wherein:, wherein the clamping device, which enables natural compression of the resin with solidification of the resin in the mold, is used, the clamping device comprises a toggle-type clamping device, the toggle-type clamping device comprises a movable platen that supports the movable mold and is slidably loaded on tie bars extended between a fixed platen that supports the fixed mold and a bearing platen, a toggle-link mechanism disposed between the bearing platen and the movable platen, and the toggle-link mechanism is driven by a driving mechanism portion so as to open/close the movable mold, wherein the natural compression results from the following: a molding injection pressure and a molding clamping force are acquired and set in advance for performing clamping in a non-lock-up state, with the molding injection pressure and the molding clamping force a predetermined molding gap is generated between the movable mold and the fixed mold in injection and filling, the clamping device is clamped with the molding clamping force in the non-lock-up state with the molding clamping force during production, the molding injection pressure is set as a limit pressure, and after the resin is injected and filled in the mold by driving the injecting device, the molding product is taken out after predetermined cooling time has elapsed, wherein the molding clamping force from mold closing to mold opening is maintained constant.

5. The molding method of an injection molding machine according to claim 4, wherein the driving mechanism portion is provided with a ball screw mechanism that advances/retreats a cross head of the toggle-link mechanism and a driving motor inputs rotation into this ball screw mechanism.

6. The molding method of an injection molding machine according to claim 1, wherein the molding injection pressure and the molding clamping force are set so that the predetermined molding gap at the maximum between the movable mold and the fixed mold becomes 0.03 to 0.30 mm.

7. The molding method of an injection molding machine according to claim 1, wherein the molding injection pressure and the molding clamping force are set so that a predetermined remaining gap is generated between the movable mold and the fixed mold after the cooling time has elapsed.

8. The molding method of an injection molding machine according to claim 7, wherein the remaining gap is smaller than the predetermined mold gap as a condition and is selected from 0.01 to 0.10 mm.

9. The molding method of an injection molding machine according to claim 1, wherein a speed limit value is set for an injection speed in the injecting device.

10. The molding method of an injection molding machine according to claim 4, wherein the molding injection pressure and the molding clamping force are set so that the predetermined molding gap at the maximum between the movable mold and the fixed mold becomes 0.03 to 0.30 mm.

11. The molding method of an injection molding machine according to claim 4, wherein the molding injection pressure and the molding clamping force are set so that a predetermined remaining gap is generated between the movable mold and the fixed mold after the cooling time has elapsed.

12. The molding method of an injection molding machine according to claim 11, wherein the remaining gap is smaller than the predetermined mold gap as a condition and is selected from 0.01 to 0.10 mm.

13. The molding method of an injection molding machine according to claim 4, wherein a speed limit value is set for an injection speed in the injecting device.

* * * * *